United States Patent
Vallmajó I Ribas

(10) Patent No.: US 10,732,009 B2
(45) Date of Patent: **\*Aug. 4, 2020**

(54) ANGLE SENSING IN AN OFF-AXIS CONFIGURATION

(71) Applicant: Infineon Technologies AG, Neubiberg (DE)

(72) Inventor: Llorenç Vallmajó I Ribas, Munich (DE)

(73) Assignee: Infineon Technologies AG, Neubiberg (DE)

(\*) Notice: Subject to any disclaimer, the term of this patent is extended or adjusted under 35 U.S.C. 154(b) by 0 days.

This patent is subject to a terminal disclaimer.

(21) Appl. No.: 16/227,250

(22) Filed: Dec. 20, 2018

(65) Prior Publication Data

US 2019/0145796 A1 May 16, 2019

Related U.S. Application Data

(62) Division of application No. 14/824,510, filed on Aug. 12, 2015, now Pat. No. 10,168,184.

(51) Int. Cl.
*G01D 5/14* (2006.01)

(52) U.S. Cl.
CPC .................. *G01D 5/145* (2013.01)

(58) Field of Classification Search
CPC ........ G01D 5/145; G01D 11/245; G01B 7/30; G01P 3/487; G01R 31/42; G01R 33/0041; G01R 33/02; G01R 35/007; G01R 35/04
USPC .......... 324/200–263, 750.01–764.01, 66–67, 324/160–180, 71.1–157, 425–470; 73/1.01–36, 37–65.09, 66–147
See application file for complete search history.

(56) References Cited

U.S. PATENT DOCUMENTS

| | | | |
|---|---|---|---|
| 5,072,181 A | 12/1991 | Burger | |
| 5,148,106 A | 9/1992 | Ozawa | |
| 5,149,962 A | 9/1992 | Maurice | |
| 5,670,877 A * | 9/1997 | Scheiber | G01D 3/036 188/181 R |
| 5,742,160 A * | 4/1998 | Bergstedt | G01P 3/487 324/162 |

(Continued)

FOREIGN PATENT DOCUMENTS

| CN | 102918755 | 2/2013 |
|---|---|---|
| CN | 104655004 | 2/2015 |

(Continued)

*Primary Examiner* — Patrick Assouad
*Assistant Examiner* — Taqi R Nasir
(74) *Attorney, Agent, or Firm* — Harrity & Harrity, LLP

(57) ABSTRACT

A system may include a magnet fixed to a rotatable object. The rotatable object may be portioned to concentrically rotate about an axis. The system may also include a magnetic angle sensor configured to determine a rotation angle of the rotatable object based on a rotating magnetic field produced by the magnet and sensed by the magnetic angle sensor. The rotating magnetic field may have a radial component and a tangential component, and the magnetic angle sensor may be positioned at a sensor position having a non-zero radial distance from the axis. At the sensor position, an amplitude of the radial component may substantially match an amplitude of the tangential component, or the radial component and the tangential component may share a substantially same gradient magnitude.

20 Claims, 9 Drawing Sheets

(56) References Cited

U.S. PATENT DOCUMENTS

| | | | |
|---|---|---|---|
| 7,385,394 B2 | 6/2008 | Auburger | |
| 8,179,126 B2 * | 5/2012 | Li | G01D 5/145 |
| | | | 324/207.2 |
| 8,324,892 B2 | 12/2012 | Rudel | |
| 8,342,892 B2 * | 1/2013 | Fan | H01R 13/025 |
| | | | 439/822 |
| 8,519,700 B2 | 8/2013 | Jerance et al. | |
| 10,168,184 B2 | 1/2019 | Vallmajo I Ribas | |
| 2003/0155909 A1 | 8/2003 | Steinruecken | |
| 2005/0122100 A1 * | 6/2005 | Wan | G01R 33/0206 |
| | | | 324/247 |
| 2010/0321006 A1 | 12/2010 | Suzuki | |
| 2011/0175600 A1 | 7/2011 | Jerance | |
| 2011/0234218 A1 * | 9/2011 | Lagouge | G01R 33/072 |
| | | | 324/247 |
| 2012/0025808 A1 * | 2/2012 | Granig | G01D 5/145 |
| | | | 324/202 |
| 2013/0063138 A1 | 3/2013 | Takahashi | |
| 2013/0234700 A1 | 9/2013 | Chauvin | |

FOREIGN PATENT DOCUMENTS

| | | |
|---|---|---|
| CN | 104656042 | 5/2015 |
| CN | 104776794 | 7/2015 |
| WO | WO 2014029885 | 2/2014 |

* cited by examiner

ANGLE SENSING IN AN OFF-AXIS CONFIGURATION

RELATED APPLICATION

This application is a divisional of U.S. patent application Ser. No. 14/824,510, filed Aug. 12, 2015 (now U.S. Pat. No. 10,168,184), the disclosure of which is incorporated herein by reference.

BACKGROUND

A magnetic angle sensor may be used to determine an orientation of a magnetic field (e.g., between zero degrees and three hundred and sixty degrees) produced by a magnet. The magnetic angle sensor may use giant mnagnetoresistance (GMR) technology, anisotropic magnetoresistance (AMR) technology, tunnel magnetoresistance (TMR) technology, or the like.

SUMMARY

According to some possible implementations, a system, may include a magnet fixed to a rotatable object, where the rotatable object may being positioned to concentrically rotate about at axis; and a magnetic angle sensor configured to determine a rotation angle of the rotatable object based on a rotating magnetic field produced by the magnet and sensed by the magnetic angle sensor, where the rotating magnetic field may have a radial component and a tangential component, where the magnetic angle sensor may be positioned at a sensor position having a non-zero radial distance from the axis, and where, at the sensor position, an amplitude of the radial component may substantially match an amplitude of the tangential component, or at the sensor position, the radial component and the tangential component may share a substantially same gradient magnitude.

According to some possible implementations, a magnetic angle sensor may include one or more sensor components configured to: determine, based on a rotating magnetic field produced by a magnet, a rotation angle of the magnet during a substantially concentric rotation of the magnet with a rotatable object, where the rotatable object may be positioned to substantially concentrically rotate about an axis, where the rotating magnetic field may have a radial component and a tangential component, and where the magnetic angle sensor may be positioned at a sensor position having a non-zero radial distance from the axis, where an amplitude of the radial component may substantially match an amplitude of the tangential component at the sensor position.

According to some possible implementations, a magnetic angle sensor may include one or more sensor components configured to: determine, based on a rotating magnetic field produced by a magnet, a rotation angle of the magnet during a substantially concentric rotation of the magnet connected to a rotatable object, where the rotatable object may be positioned to substantially concentrically rotate about an axis, where the rotating magnetic field may have a radial component and a tangential component, and where the magnetic angle sensor may be positioned at a sensor position having a non-zero radial distance from the axis, where the radial component and the tangential component may share a substantially same gradient magnitude at the sensor position.

DETAILED DESCRIPTION

Figure 1:
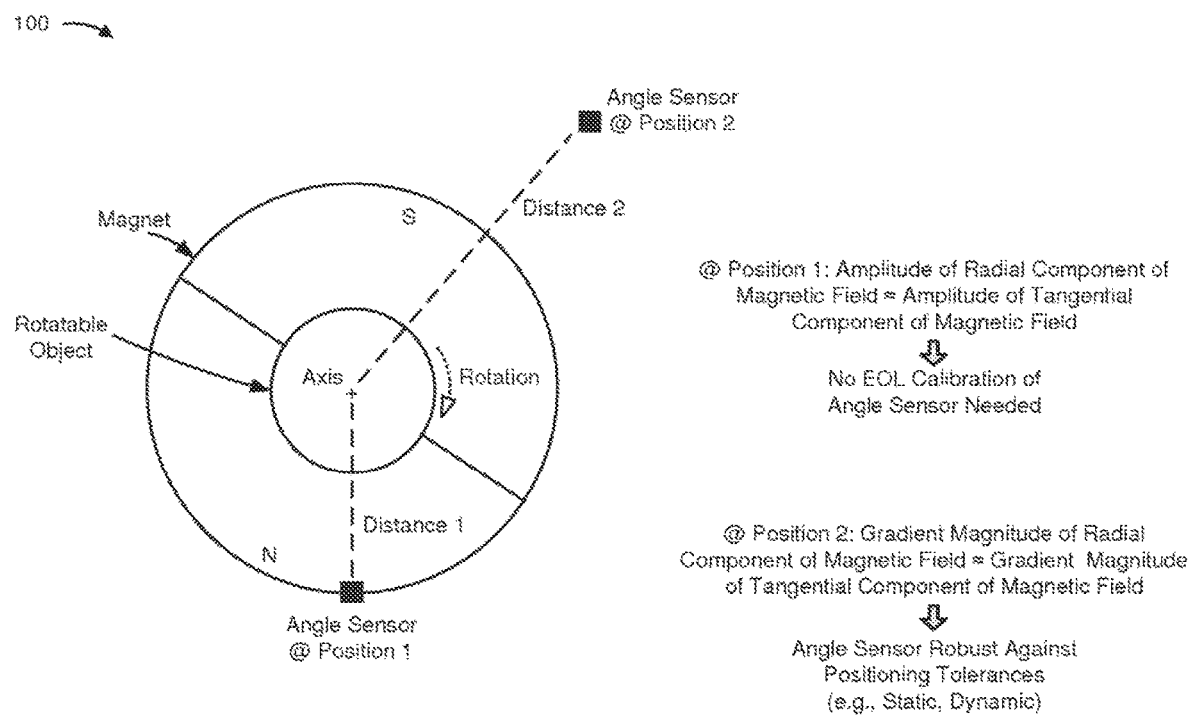
FIG. 1 is a diagram of an overview of an example implementation described herein.

The following detailed description of example implementations refers to the accompanying drawings. The same reference numbers in different drawings may identify the same or similar elements.

An angle sensor may be configured to sense one or more components of a rotating magnetic field. The rotating magnetic field may be generated by a magnet rotating about an axis (e.g., an axis passing through a center of a rotatable object). Conveniently, the magnet may be rotating concentrically with the rotatable object. It is assumed for the remainder of this disclosure that the magnet follows the rotational movement of the rotatable object (i.e., that the magnet rotates about the axis in correspondence to the rotatable object). This may be achieved by providing a connection (e.g., a mechanical connection) between the magnet and the rotatable object. Based on the rotating magnetic field, more precisely on the one or more components of the rotating magnetic field, a rotation angle of the rotatable object may be determined, (e.g., with respect to a reference angle). Assuming non-slip between the magnet and the rotatable object, the angle of the magnet corresponds to the rotational angle of the rotatable object.

The angle sensor may be configured to sense a radial component of the magnetic field (e.g., a component of the magnetic field in a direction corresponding to a radius of the magnet) and a tangential component of the magnetic field (e.g., a component of the magnetic field in a direction corresponding to a tangent of the magnet and substantially orthogonal to the radial component of the magnetic field). Here, the angle sensor may determine the rotation angle of the magnet, and hence the rotatable object, based on the radial component of the rotating magnetic field and the tangential component of the rotating magnetic field.

In some cases, the angle sensor may be positioned along the axis of rotation of the magnet and the rotatable object (herein referred to as "on-axis"). In other words, the angle sensor may be placed at a position on the axis of rotation at an axial distance from the center of the magnet. For the remainder of this disclosure it shall be assumed that the axis of rotation extends beyond the length of the rotatable object. Therefore, a sensor position along an extension of the axis of rotation beyond the actual length of the rotatable object shall also be referred is as an "on-axis" position.

When placed in an on-axis position, the angle sensor may be capable of accurately determining the rotation angle of the magnet and/or may be robust against one or more positioning tolerances, such as an assembly tolerance, a dynamic change in positioning (e.g., due to vibration), or the like.

However, in some scenarios, it may not be possible to place the angle sensor in an on-axis position (e.g., due to spacing limitations, due to movement of the rotatable object in another direction with respect to the angle sensor, such as a vertical direction, a horizontal direction, etc.). Therefore, in such a case, the angle sensor may be placed at a position at a radial distance from the axis of rotation (herein referred to as "off-axis"). A person of ordinary skill will appreciate that the radial distance will typically be larger than the radius of the rotatable object. Such off-axis positioning of the angle sensor may introduce non-linearities to the magnetic field as sensed by the angle sensor, which may necessitate end-of-line (EOL) calibration of the angle sensor and/or may reduce robustness of the angle sensor against static positioning tolerances, dynamic positioning tolerances, or the like, such that the possibility of an angle error, in a determination of the rotation angle may be increased (e.g., as compared to placement of the angle sensor at an on-axis position).

Implementations described herein may relate to placing art angle sensor at a first off-axis position, relative to a magnet, such that an amplitude of a radial component of a rotating magnetic field, produced by the magnet, substantially matches an amplitude of a tangential component of the totaling magnetic field. In some implementations, placing the angle sensor at the first off-axis position may eliminate a need for EOL calibration of the angle sensor.

Implementations described herein may further relate to placing the angle sensor at a second, off-axis position such that a gradient magnitude of the radial component of the rotating magnetic field is substantially the same as a gradient magnitude of the tangential component of the rotating magnetic field. In some implementations, placing the angle sensor at the second off-axis position may increase robustness of the angle sensor against a static positioning tolerance, a dynamic positioning tolerance, or the like.

FIG. 1 is a diagram of an overview of an example implementation 100 described herein. For the purpose of example implementation 100, assume that a magnet is connected to a rotatable object (shown in a cross-sectional view in FIG. 1), and that the rotatable object concentrically rotates around an axis at the center of the rotatable object. Typically, the magnet is mounted fixedly on the rotatable object in order to follow the rotational movement of the rotatable object. This is to say that the rotation of the magnet represents or corresponds to the rotational movement of the rotatable object about the axis. Notably, while the magnet is depicted as circular or annular, in some implementations, the magnet may be of another form, including elliptical but also of non-rotational symmetry. Due to the rotation of the rotatable magnet about the axis, the magnet will produce a rotating magnetic field as the magnet comprises more than one north pole (N) and south pole (S) that will move relative to a given position of an angle sensor (e.g., in an on-axis or an off-axis position). Further, assume that an angle sensor is capable of sensing a radial component and a tangential component of the magnetic field in order to determine a rotation angle of the magnet with respect to a reference direction, and hence the rotational angle of the rotatable object. Finally, assume that the angle sensor may not be placed in an on-axis position (e.g., due to a spacing limitation, due to movement of the magnet in a direction, etc.).

As shown in the left portion of FIG. 1, the angle sensor may be placed at a first position (e.g., position 1) that is at a first radial distance (e.g., distance 1) from the axis about which the rotatable object, and the magnet, rotate. As noted in the right portion of FIG. 1, placing the angle sensor at the first radial distance from the axis of rotation may cause an amplitude of the radial component of the magnetic field to substantially match (i.e., be approximately equal to) an amplitude of a tangential component of the magnetic field. As further noted, placing the angle sensor at the first radial distance from the axis of rotation may eliminate a need for EOL calibration of the angle sensor.

As further shown, in the left portion of FIG. 1, the angle sensor may alternatively be placed at a second position (e.g., position 2) that is at a second radial distance (e.g., distance 2) from the axis of rotation of the magnet. As further noted in the right portion of FIG. 1, placing the angle sensor at the second radial distance from the axis of rotation may cause a gradient magnitude of the radial component of the magnetic field to be substantially the same as (i.e., be approximately equal to) a gradient magnitude of the tangential component of the magnetic field. As noted, placing the angle sensor at the second radial distance may increase robustness of the angle sensor against one or more positioning tolerances associated with the angle sensor, such as a static positioning tolerance (e.g., an assembly tolerance), a dynamic tolerance, or the like.

In this way, the angle sensor may be placed at an off-axis location such that operation of the angle sensor may be improved (e.g., by not requiring EOL calibration, by being robust against one or more positioning tolerances, etc.).

Figures 2A, 2B:
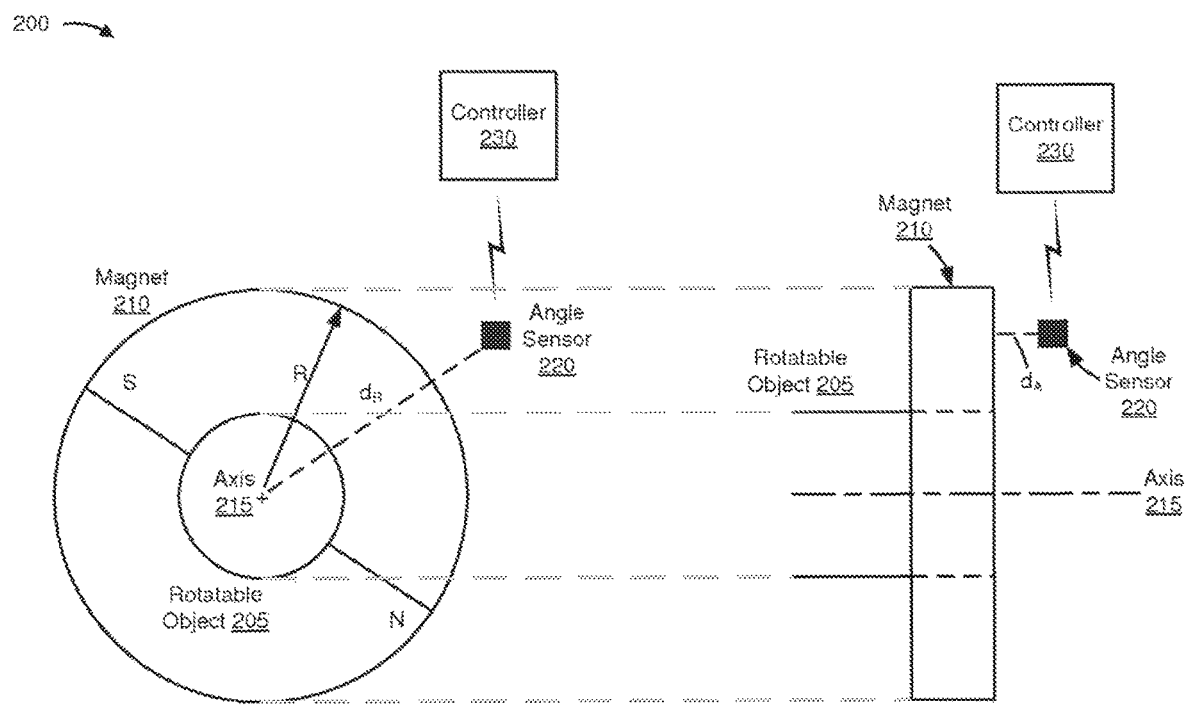
FIGS. 2A and 2B are diagrams of an example environment in which apparatuses described herein may be implemented.

FIGS. 2A and 2B are diagrams of example environments 200 in which apparatuses described herein may be implemented. As shown in FIG. 2A, environment 200 may include a rotatable object 205, a magnet 210, an angle sensor 220, and a controller 230.

Rotatable object 205 may include an object positioned to concentrically rotate about axis 215. For example, rotatable object 203 may include a rotational component of a combustion engine, such as a crank shaft, a cam shaft, or the like. In some implementations, rotatable object 205 may be connected (e.g., mechanically) to magnet 210 such that a rotation angle of magnet 210 corresponds to a rotation angle of rotatable object 205.

Magnet 210 may include one or more magnets positioned to rotate with rotatable object 205 about axis 215. In the example environment 200 shown in FIG. 2A, magnet 210 comprises a first half forming a north pole (N) and a second half forming a south pole (S), so that magnet 210 comprises one pole pair. A person of ordinary skill will appreciate that magnet 210 may, without limitation, comprise more than one pole pair in another implementation. In some implementations, magnet 210 may include a ring magnet that is positioned concentrically about axis 215 that passes through the center of rotatable object 205 and magnet 210, as shown in the cross-sectional view of FIG. 2A. While magnet 210 is shown as circular FIG. 2A, magnet 210 may be of elliptical shape in an instance in which an angle between a ring plane and axis 215 deviates from a substantially perpendicular relation. The ring plane is a plane symmetrically cutting through magnet 210 and includes the magnet center. In most practical cases, the ring plane may be substantially perpendicular to axis 215. As another example, magnet 210 may include a disk magnet that is positioned to rotate with rotatable object 205 about axis 215. A disk magnet may be of interest for an arrangement of magnet 210 at an end of rotatable object 205 (not shown). Rotation of rotatable object 205 will correspond to rotation of the disk magnet provided there is a non-slip relation between an end face of rotatable object 205 and the disk magnet.

As yet another example, magnet 210 may include a magnet of another shape, that is positioned to rotate with, rotatable object 205 about axis 215. In some implementations, magnet 210 may include two alternating poles on two portions of magnet 210 (e.g., a north pole on a first half of magnet 210, a south, pole on a second half of magnet 210). Additionally, or alternatively, magnet 210 may include a dipole magnet (e.g., a dipole bar magnet, a circular dipole magnet, an elliptical dipole magnet, etc.), a permanent magnet, an electromagnet, a magnetic tape, or the like. Magnet 210 may be comprised of a ferromagnetic material (e.g., Hard Ferrite), and may produce a magnetic field. Magnet 210 may further comprise a rare earth magnet which may be of advantage due to an intrinsically high magnetic field strength of rare earth magnets. As described above, in some implementations, magnet 210 may be attached to or coupled with rotatable object 205 for which a rotation angle is to be measured by angle sensor 220.

Angle sensor 220 may include one or more apparatuses for detecting components of a magnetic field for use in determining an angle of rotation of magnet 210. For example, angle sensor 220 may include one or more circuits (e.g., one or more integrated circuits). In some implementations, angle sensor 220 may be placed at a position relative to magnet 210 such that angle sensor 220 may detect components of a magnetic field generated by magnet 210.

In some implementations, angle sensor 220 may include two or more sensing elements configured to sense an amplitude of a component of a magnetic field present at angle sensor 220 by magnet 210, such as a radial component of the rotating magnetic field, a tangential component of the rotating magnetic field, or the like.

For example, the first and second sensing element of the angle sensor 220 may be implemented as a single half bridge as known to a person of ordinary skill in the art. The first sensing element of the half bridge may be configured to sense the radial component of the rotating magnetic field, while the second sensing element of the half bridge may be configured to sense the tangential, component of the rotating magnetic field at the position of the respective sensing elements. It will be appreciated that the angle sensor 220 employing the single half bridge only, will not be able to unambiguously detect an angular position at start-up. Instead, a second measurement will fee required to resolve the ambiguity inherent to half bridges.

Alternatively, angle sensor 220 may implement the first sensing element as a first sensor half bridge configured to sense an amplitude of the radial component of the rotating magnetic field generated by magnet 210 at the position of the first sensor bridge, and a second sensor half bridge configured to sense an amplitude of the tangential component of the magnetic field produced by magnet 210 at the position of the second sensor half bridge. The use of first and second sensor half bridges is of interest for applications in which a start-op angular position is required and it is not practical to take a second reading in order to establish the current angular position. Such limitations apply to camshaft or crankshaft angle sensors in vehicles but are not limited thereto. While the first and second half bridges may provide an unambiguous start-up angular position and angular values of higher accuracy as compared to the single half bridge angle sensor, as a trade-off, angle sensor 220 comprising half bridges as sensing elements may be more expensive, now comprising four magnetoresistive elements rather than two as for the single half bridge angle sensor 320. For angle sensor 226 implemented using two half bridges as sensing elements, each sensing element is configured to output two output signals (typical sine and cosine signals) corresponding to the amplitude of the component of the magnetic field at the position of the respective half bridge. In some implementations, the two or more output signals may be used (e.g., by angle sensor 220 and/or controller 230) to determine a rotation angle of magnet 210, and hence the rotation angle of rotatable object 205.

As a further alternative, a full bridge (e.g., a Wheatstone bridge) may be used as the first sensing element, and a second full bridge may be used as the second sensing element in order to determine an amplitude of the radial component and the tangential component of the rotating magnetic field, respectively. Using the full bridge as first and second sensing element will improve accuracy of the determined radial and tangential components over those values determined using half bridges as individual sensing elements or the one half bridge only comprising both first and second sensing element. As a trade-off, angle sensor 220 employing two full bridges will be more expensive and require more space within an integrated circuit.

In some implementations, the integrated circuit may include an integrated controller 230 (e.g., such that an output of angle sensor 220 may include information that describes a rotation angle of magnet 210 and rotatable object 205). Additional details regarding angle sensor 220 are described below with regard to FIG. 3.

FIG. 2A shows a cross-sectional view of an example environment 200. As shown in FIG. 2A, in some implementations, angle sensor 220 may be placed at a radial distance (e.g., $d_R$) from an axis of rotation of magnet 210. In some implementations, the radial distance may be less than an outer radius of magnet 210 (e.g., R). If the radial distance $d_R$ is less than or equal to the outer radius R, angle sensor 220 should be positioned at a position beyond an end face of rotatable object 205, in order not to intersect with rotatable object 206. In some implementations, the radial distance may be greater than the radius of magnet 210, such as a distance that is approximately two times the radius of magnet 210. In some implementations, the radial distance at which angle sensor 220 is placed may correspond to a position at which an amplitude of a radial component of the rotating magnetic field, produced by magnet 210 and sensed by angle sensor 220, substantially matches an amplitude of a tangential component of the rotating magnetic field, as described in further detail below. Additionally, or alternatively, the radial distance at which angle sensor 220 is placed may correspond to a position at which a gradient magnitude of the radial component of the rotating magnetic field is substantially the same as a gradient magnitude of the tangential component of the rotating magnetic field, as described in further detail below.

FIG. 2B shows a side view of example environment 200, and may correspond to the cross-sectional view of example environment 200 shown in FIG. 2A. As shown in FIG. 2B, in some implementations, angle sensor 220 may be placed at an axial distance (e.g., $d_A$) in a direction of axis 215 and relative to a surface of magnet 210 and rotatable object 205.

Controller 230 may include one or more circuits associated with determining a rotation angle of magnet 210, and providing information associated with the rotation angle of magnet 210 and hence the rotation angle of rotatable object 205. For example, controller 230 may include one or more circuits (e.g., an integrated circuit, a control circuit, a feedback circuit, etc.). Controller 230 may receive input signals from one or more sensors, such as one or more angle sensors 220, may process the input signals (e.g., using an analog signal processor, a digital signal processor, etc.) to generate an output signal, and may provide the output signal to one or more other devices or systems. For example, controller 230 may receive one or more input signals from angle sensor 220, and may use the one or more input signals to generate an output signal comprising the angular position of rotatable object 205.

The number and arrangement of apparatuses shown in FIGS. 2A and 2B are provided as an example. In practice, there may be additional apparatuses, fewer apparatuses, different apparatuses, or differently arranged apparatuses than those shown in FIGS. 2A and 2B. Furthermore, two or more apparatuses shown in FIGS. 2A and 2B may be implemented within a single apparatus, or a single apparatus shown in FIGS. 2A and 2B may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
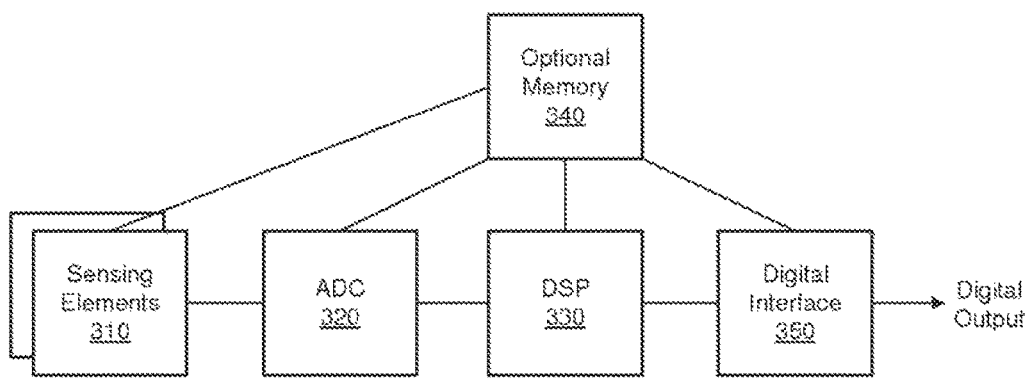
FIG. 3 is a diagram of example components of an angle sensor included in the example environment of FIGS. 2A and 2B.

FIG. 3 is a diagram of example components of angle sensor 220 included in example environment 200 of FIGS. 2A and 2B. As shown, angle sensor 220 may include two or more sensing elements 310, an analog-to-digital convertor (ADC) 320, a digital signal processor (DSP) 330, a memory component 340, and a digital interface 350.

Sensing element 310 may include one or more apparatuses for sensing an amplitude of a component of a magnetic field present at the angle sensor 220 (e.g., the magnetic field generated by magnet 210). For example, sensing element 310 may include a Hall sensor that operates based on a Hall-effect. As another example, sensing element 310 may include a magnetoresistance (MR) sensor, comprised of a magnetoresistive material (e.g., nickel iron (NiFe)), where the electrical resistance of the magnetoresistive material may depend on a strength and/or a direction of the magnetic field present at the magnetoresistive material. Here, sensing element 310 may measure magnetoresistance based on an anisotropic magnetoresistance (AMR) effect, a giant magnetoresistance (GMR) effect, a tunnel magnetoresistance (TMR) effect, or the like. As an additional example, sensing element 310 may include a variable reluctance (VR) sensor that operates based on induction.

ADC 320 may include an analog-to-digital converter that converts an analog signal from the one or more sensing elements 310 to a digital signal. For example, ADC 320 may convert analog signals, received from the one or more sensing elements 310, into digital signals to be processed by DSP 330. ADC 320 may pro vide the digital signals to DSP 330. In some implementations, angle sensor 220 may include one or more ADCs 320.

DSP 330 may include a digital signal processing device or a collection of digital signal processing devices. In some implementations, DSP 330 may receive a digital signal from ADC 320 and may process the digital signal to form an output signal (e.g., destined for controller 230 best seen in FIG. 2A or 2B), such as an output signal associated with determining the rotation angle of magnet 210 rotating with rotatable object 205.

Optional memory component 340 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by angle sensor 220. In some implementations, memory component 340 may store information associated with processing performed by DSP 330. Alternatively, memory component 340 may store configurational values of parameters for the two or more sensing elements 310 and/or information for one or more other components of angle sensor 220, such as ADC 320 or digital interface 350.

Digital interface 350 may include an interface via which angle sensor 220 may receive and/or provide information from and/or to another device, such as controller 230 (see FIG. 2A, 2B). For example, digital interface 350 may provide the output signal, determined by DSP 330, to controller 230 and further receive information from the controller 230.

The number and arrangement of components shown in FIG. 3 are provided as an example. In practice, angle sensor 220 may include additional components, fewer components, different components, or differently arranged components than those shown in FIG. 3. Additionally, or alternatively, a set of components (e.g., one or more components) of angle sensor 220 may perform one or more functions described as being performed by another set of components of angle sensor 220.

Figure 4A:
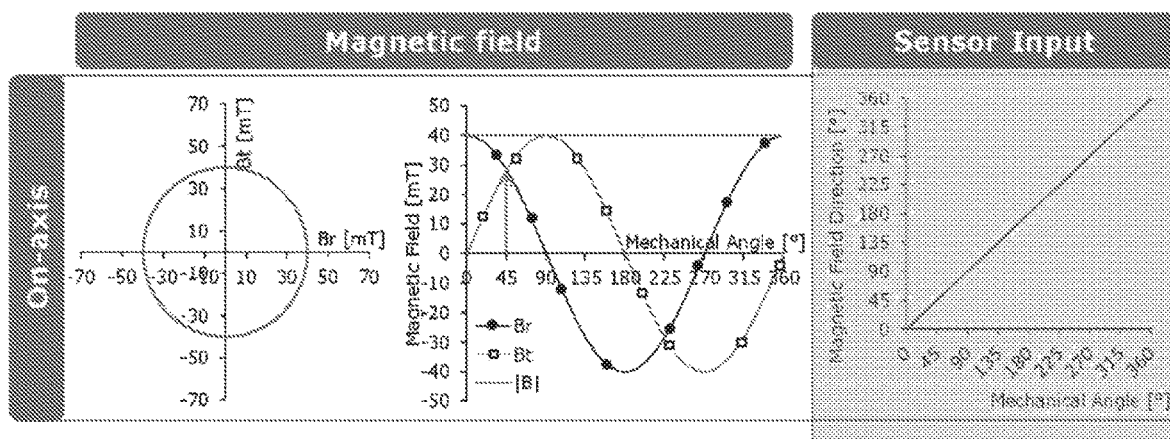
FIGS. 4A and 4B include graphical representations that show examples of how placing an angle sensor in an off-axis position, relative to a magnet that produces a magnetic field, may introduce non-linearities to the magnetic field as experienced by the angle sensor.
Figure 4B:
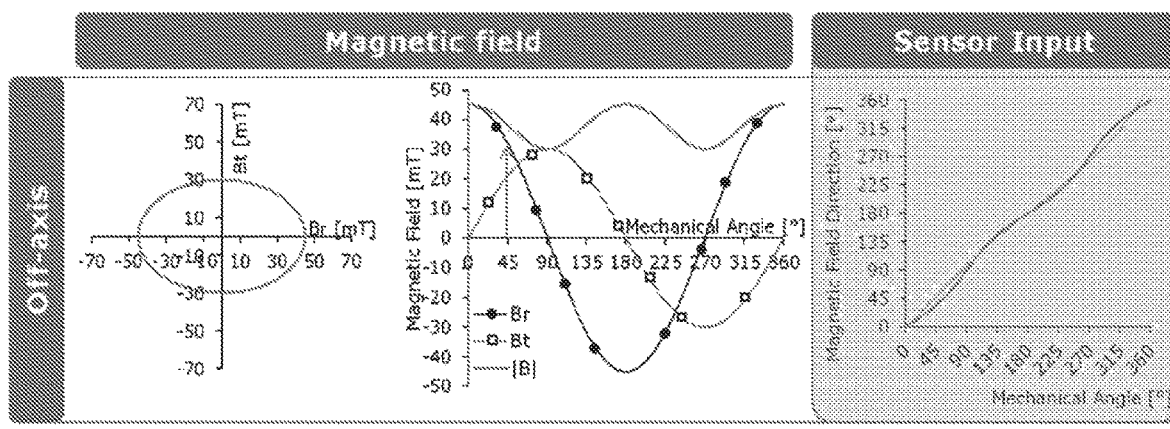

FIGS. 4A and 4B include graphical representations 400 that show examples of how placing angle sensor 220 in an off-axis position, relative to magnet 210 that produces a magnetic field, may introduce non-linearities to the magnetic field present at and hence sensed by angle sensor 220. For the purposes of FIG. 4A, assume that angle sensor 220 is placed at an on-axis position relative to magnet 210.

As shown in the center portion of FIG. 4A, when angle sensor 220 is placed in the on-axis position, a magnitude |B| of the magnetic field sensed by angle sensor 220 may be homogenous (i.e., constant) for any rotation angle (shown as "mechanical angle" along the horizontal direction) of magnet 210. For example, as shown by the "|B|" line in the center portion of FIG. 4A, the magnitude of the rotating magnetic field, present at angle sensor 220 far any rotation angle, is constant. Here, the rotation angle may be determined based on the radial component (e.g., "Br") and the tangential component (e.g., "Bt") that make up the homogenous magnitude of the magnetic field based on the following equation:

$$|B|=\sqrt{B_r^2+B_t^2}.$$

The homogeneity of the magnitude of the magnetic field may be further illustrated by the intersection of the radial component and the tangential component at a 45° rotation angle (shown by the arrow on the center portion of FIG. 4A). In other words, a homogenous magnetic field would cause the radial, component and the tangential component to be equal at a 45° rotation angle.

The homogeneity of the magnitude of the rotating magnetic field may also be illustrated by the circular shape of the plot in the left portion of FIG. 4A. As shown, plotting the tangential component Bt over the radial component Br yields the circular shape provided that there are no further effects affecting the magnetic field components Br and Bt, such as variations in position of angle sensor 220 or off-set errors of individual sensing elements 310 of angle sensor 220, as known to a person of ordinary skill in the art.

As shown by the right portion of FIG. 4A, due to the homogeneity of the magnitude of magnetic field |B|, the direction of the magnetic field sensed by the angle sensor 220 may have a linear non-ambiguous relationship with respect to the rotation angle of magnet 210. In other words, the direction of the rotating magnetic field sensed by angle sensor 220 may vary linearly with respect to the rotation angle of magnet 210, for an on-axis positioning of the angle sensor 220. In such a case, EOL calibration may not be needed and/or angle sensor 220 may be robust against a positioning tolerance, such as an assembly tolerance, a dynamic tolerance due to vibration, or the like. However, when angle sensor 220 is placed at an off-axis position, non-linearities may be introduced to the magnetic field present at angle sensor 220, as described below with respect to FIG. 4B.

For the purposes of FIG. 4B, assume that angle sensor 220 is placed at an off-axis position relative to magnet 210, as shown in FIG. 2A as a non-limiting example. As shown in the center portion of FIG. 4B, when angle sensor 220 is placed in the off-axis position, the magnitude of rotating magnetic field |B| sensed by angle sensor 220 may not be homogenous (i.e., may not be constant) for different rotation angles (shown as "mechanical angle") of magnet 210. For example, as shown by the "|B|" line in the center portion of FIG. 4B, the magnitude of the rotating magnetic field sensed by angle sensor 220 for various rotation angles of magnet 210, may not be constant as sensed by angle sensor 220. As such, a rotation angle determined based on the radial component (e.g., "Br") and the tangential component (e.g., "Bt") that make up the non-homogenous magnitude of the rotating magnetic field according to the above formula, may not accurately represent the rotation angle of magnet 210 (e.g., the rotation angle may include an angle error). The non-homogeneity of the magnitude of the magnetic field, may be further illustrated by the inequality of the radial component and the tangential component at a 45° rotation angle (shown by the arrow on the center portion of FIG. 4B). In other words, a non-homogenous magnetic field would cause the radial component and the tangential component to differ at a 45° rotation angle.

The non-homogeneity of the magnetic field may also be illustrated by the elliptical shape of the plot on the left portion of FIG. 4B. As shown, plotting the tangential component Bt over the radial component Br yields the elliptical shape provided that there are no further effects affecting the magnetic field components Br and Bt, such as variations in position of angle sensor 220 or off-set errors of individual sensing elements 310, as known to a person of ordinary skill in the art As shown by the right portion of FIG. 4B, due to the non-homogeneity of the magnitude of the rotating magnetic field sensed by the angle sensor 220, the direction of the magnetic field may not have a linear relationship with respect to the rotation angle of magnet 210 and hence rotatable object 205. In other words, the direction of the magnetic field sensed by angle sensor 220 may not vary linearly with respect to the rotation angle of magnet 210. As such, EOL calibration of angle sensor 220 may be needed. Furthermore, the off-axis positioning of angle sensor 220 may reduce a robustness of angle sensor 220 against positioning tolerances.

However, as described below, angle sensor 220 may be placed at a first off-axis position such that EOL calibration may not be necessary. Alternatively, as described below, angle may be placed at a second off-axis position such that, angle sensor 220 is robust against positioning tolerances.

As indicated above, FIGS. 4A and 4B are provided merely as examples. Other examples are possible and may differ from what was described with regard to FIGS. 4A and 4B.

FIGS. 5A-5D are diagrams of an example implementation 500 relating to off-axis positioning of angle sensor 220, as described herein. For the purposes of example implementation 500, assume magnet 210 is connected to rotatable object 205 that is positioned to concentrically rotate about axis 215. Further, assume that angle sensor 220 is to be placed at an off-axis position relative to axis 215 about which rotatable object 205 concentrically rotates. For example, angle sensor 220 may be placed in an off-axis position due to a spacing limitation. As another example, angle sensor 220 may be placed in an off-axis position due to a possible movement of rotatable object (and magnet 210) in another direction, such as a vertical direction relative to angle sensor 220, a horizontal direction relative to angle sensor 220, or the like.

Figure 5A:
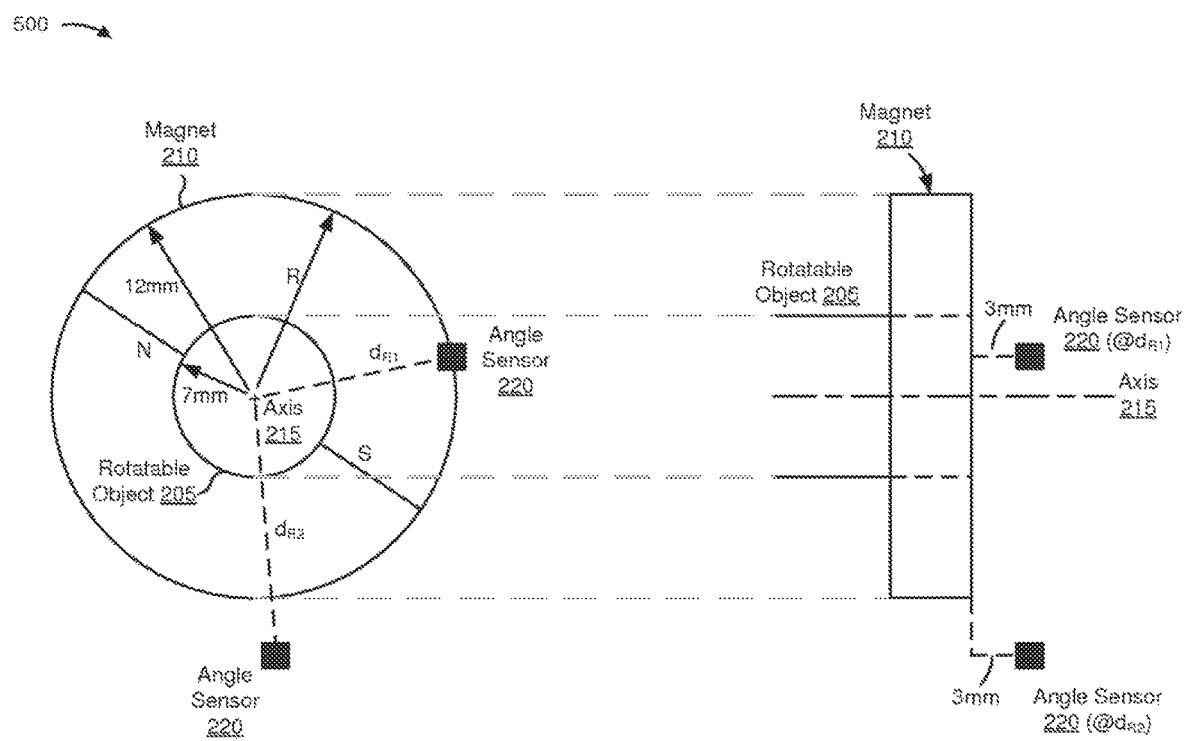
FIGS. 5A-5D are diagrams of an example implementation relating to off-axis positioning of an angle sensor, as described herein.

As shown in a cross-sectional view in the left portion of FIG. 5A, magnet 210 may include a ring magnet with an inner radius of 7 millimeters (mm) and an outer radius of 12 mm. Let us further assume that angle sensor 220 is to be placed at an axial distance (e.g., a distance in axial direction from a surface of magnet 210 and rotatable object 205) of 3 mm, best seen in the side view in the right portion of FIG. 5B. Here, it may be desirable to place angle sensor 220 at a first position corresponding to a first radial distance (e.g., $d_{R1}$) from the axis of rotation, such that EOL calibration of angle sensor 220 is not needed, or at a second position corresponding to a second radial distance from the axis of rotation (e.g., $d_{R2}$) such that angle sensor 220 is robust against one or more positioning tolerances.

Figure 5B:
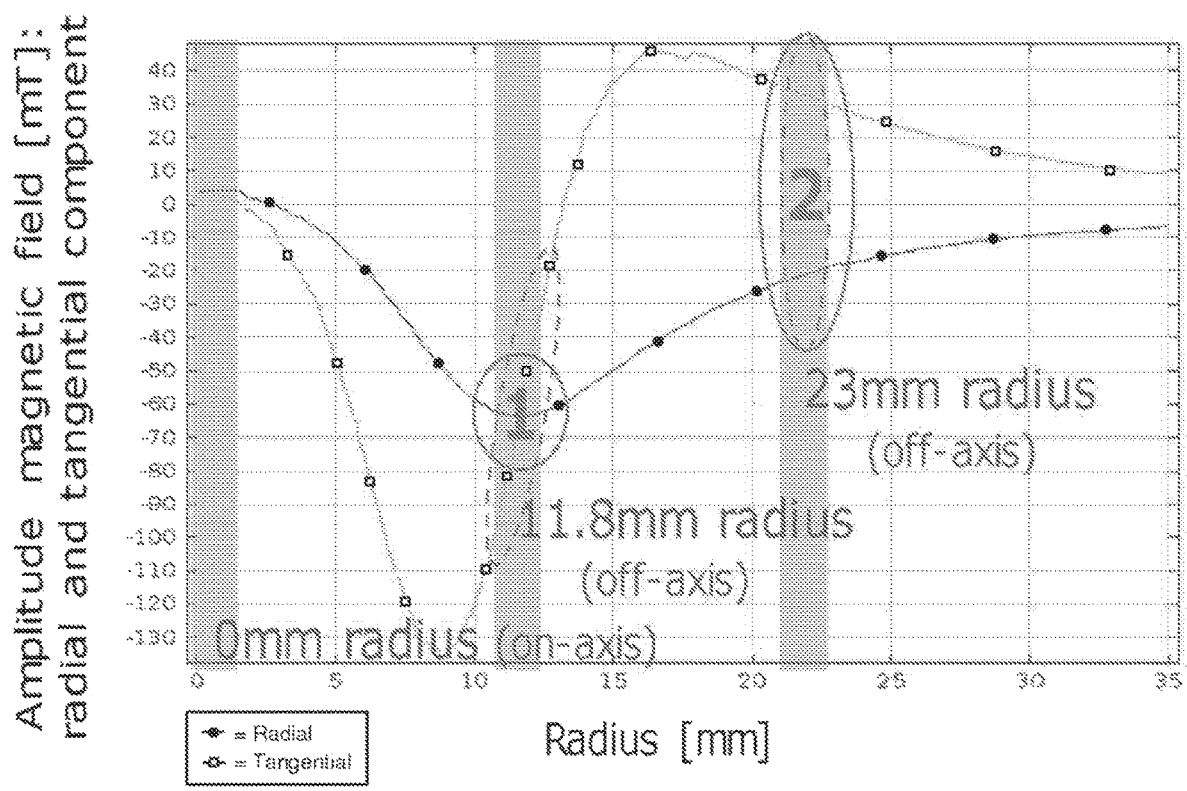

FIG. 5B is a graphical representation associated with identifying an off-axis position for angle sensor 220 in order to eliminate a need for EOL calibration or to increase robustness of angle sensor 220 against a positioning tolerance. As shown, in some implementations, the first radial distance and the second radial distance may be determined based on comparing a radial component of a rotating magnetic field generated by magnet 210 and a tangential component of the rotating magnetic field generated by magnet 210 across a range of radial distances at a respective radial position of the angle sensor 220. For an example magnet, the radial component (solid points in FIG. 5B) of the rotating magnetic field and the tangential component (open squares in FIG. 5B) of the rotating magnetic field are plotted for a radial distance ranging from 0 mm to 35 mm in FIG. 5B. The radial component and the tangential component may vary across the range of radial distances (e.g., between approximately −140 milliteslas (mT) and approximately 50 mT).

Here, the first position, corresponding to the first radial distance associated with eliminating a need for EOL calibration, may be identified by a radial distance at which the amplitude of radial component of the magnetic field substantially matches (e.g., within 1%, within 5%, within 10%, etc.) the amplitude of the tangential component of the magnetic field. In this example, the first position may be identified as a position with a radial distance of approximately 11.8 mm from the axis of rotation (e.g., identified by the shaded area corresponding to point 1). Here, if angle sensor 220 is placed at a radial distance of 11.8 from the axis of rotation of magnet 210, the amplitude of the radial component of the magnetic field may substantially match the tangential component of the magnetic field. As such, a need for EOL calibration of angle sensor 220 may be eliminated when angle sensor 220 is placed 11.8 mm from the axis of rotation. Here, the substantial match between the amplitude of the radial component of the magnetic field and the amplitude of the tangential component of the magnetic field results in a vector length (a module between the radial component and the tangential component) of a substantially constant magnitude through, an entire (e.g., 360°) rotation. Therefore, an angular change of the magnetic field direction is substantially linear to the mechanical rotation of magnet 210 connected to rotatable object 205. As the behavior is linear, no angle error is introduced, eliminating a need for an end-of-line calibration and/or another type of compensation.

The second position, corresponding to the second radial distance associated with increasing robustness against positioning tolerances, may be identified by a radial distance at which a magnitude of a gradient of the radial component of the rotating magnetic field is substantially the same as (e.g., within 1%, within 5%, within 10% etc.) a magnitude of a gradient of the tangential component of the rotating magnetic field. In this example, the second position may be identified as a position with a radial distance of approximately 23.0 mm from the axis of rotation (e.g., identified by the shaded area corresponding to point 2). Here, if angle sensor 220 is placed at a radial distance of 23.0 from the axis of rotation of magnet 210, the gradient magnitude of the radial component of the rotating magnetic field may be substantially the same as the gradient magnitude of the tangential component of die rotating magnetic field. As such, angle sensor 220 may be robust against one or more positioning tolerances (e.g., an assembly tolerance, a dynamic tolerance, etc.) when angle sensor 220 is placed 23.0 mm from the axis of rotation for the illustrated example.

Notably, the second position may be identified based on a radial distance at which the magnitudes of the gradients are substantially the same, rather than a radial distance at which the gradients are substantially the same. In other words, as shown in FIG. 5B, the gradients need not have a same sign (e.g., the radial component may have positive gradient and the tangential component may have a negative gradient).

In some implementations, as illustrated in example implementation 500, the first position may correspond to a first radial distance that in approximately equal to a radius of magnet 210 (e.g., 12 mm≈11.8 mm). Similarly, the second position may correspond to a second radial distance that is approximately equal to two times the radius of magnet 210 (e.g., 12 mm×2≈23 mm).

In some implementations, the first radial distance and the second radial distance may depend on one or more geometrical factors associated with magnet 210 and/or angle sensor 220, such as an inner radius of magnet 210, an outer radius of magnet 210, an axial distance at which angle sensor 220 is to be placed relative to a surface of magnet 210, or the like. Additionally, or alternatively, the first radial distance and the second radial distance may depend on one or more material factors associated with magnet 210 and/or angle sensor 220, such as a type of material from which magnet 210 is constructed, a strength of a magnetic field produced by magnet 210, a type of angle sensor 220 (e.g., Hall-effect, AMR, GMR, TMR, VR, etc.), or the like. In other words, the first radial, distance and the second radial distance may vary based on one or more geometrical factors and/or material factors associated with magnet 210 and/or angle sensor 220.

Figure 5C:
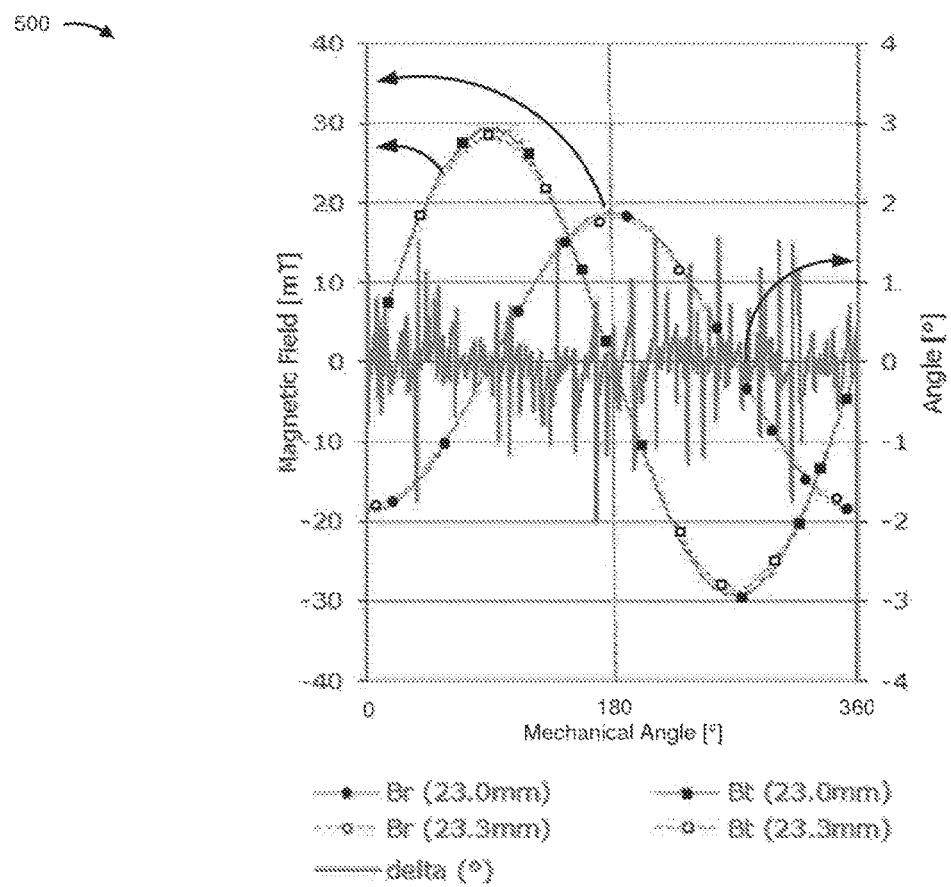

FIG. 5C is a graphical representation showing an example of robustness of angle sensor 220 against a radial positioning tolerance of 0.3 mm when angle sensor 220 is placed at the second position (e.g., 23 mm). Solid symbols in FIG. 5C correspond, to radial and tangential components (see left scale of FIG. 5C) of the rotating magnetic field over the rotation angle at a radial position of 23 mm, corresponding to region 2 of FIG. 5B. For comparison, open symbols correspond to radial and tangential components of the rotating magnetic field at a radial distance of 23.3 mm. The radial component of the rotating magnetic field is illustrated as solid circle for the radial position of 23 mm, while open circles represent the radial component of the rotating magnetic field at the radial position of 23.3 mm. The tangential component of the rotating magnetic field is illustrated as solid squares for the radial position of 23 mm, while open squares represent the tangential component of the rotating magnetic field, at the radial position of 23.3 mm. As shown, even with the 0.3 mm displacement in the radial direction (e.g., due to an assembly tolerance, a vibration, a dynamic tolerance, etc.), the radial component of the magnetic field at 23.0 mm and 23.3 mm may be substantially unchanged (best seen by comparing open and closed squares in FIG. 5C). The tangential component of the magnetic field also remains substantially unchanged (best seen by comparing open and closed circles in FIG. 5C). As further shown (e.g., by the "delta (°)" line pertaining to the right scale of FIG. 5C), an angle error between an angle determined at the 23.0 mm radial position and the 23.3 mm radial position may be substantially less than 1°. A person of ordinary skill in the art will appreciate that the error as displayed in FIG. 5C is dominated by some noise due to an artifact from a mesh used in the simulation, but not a reliable representation of the angle error. As such, angle sensor 220, placed at the second radial position, may be robust against a positioning tolerance in the radial direction.

Figure 5D:
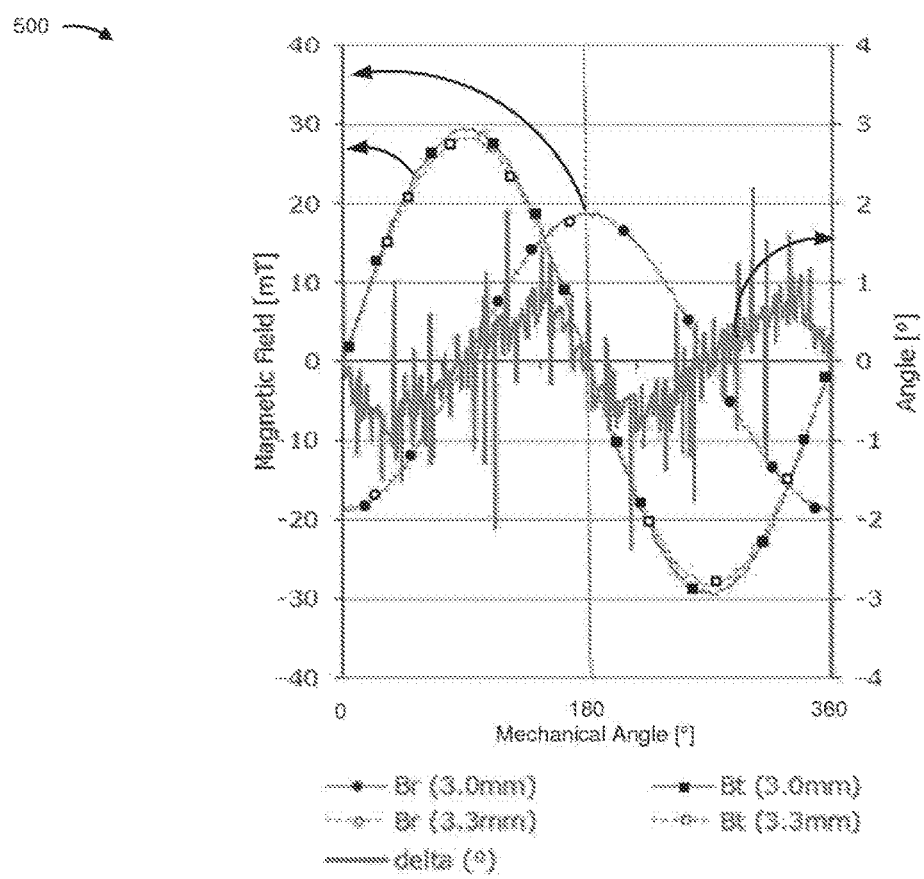

FIG. 5D is an example graphical representation, showing robustness of angle sensor 220 against an axial positioning tolerance of 0.3 mm angle sensor 220 is placed at the second position (e.g., 23 mm) and at an axial distance of 3.0 mm (i.e., the axial distance as described above with regard to example implementation 500). As shown, even with the 0.3 mm displacement in the axial direction (e.g., due to an assembly tolerance, a vibration, a dynamic tolerance, etc.), the radial component of the rotating magnetic field corresponding to the 3.0 mm axial distance (solid circles in FIG. 5D) and the radial component of the rotating magnetic field at the 3.3 mm axial distance (open circles in FIG. 3D) are substantially unchanged. The tangential component of the rotating magnetic field may also be substantially unchanged by the 0.3 mm variation in axial direction (best seen by comparing solid squares and open squares of FIG. 5D). As further shown, (e.g., by the "delta (°)" line pertaining to the right scale of FIG. 5D), an angle error between an angle determined at the 3.0 mm axial position and the 3.3 mm axial position may be approximately less than 1°, Comparing the angle errors from FIGS. 5C and 5D one will find there is some variation in the error for FIG. 5D as the error shows some kind of oscillating behavior besides the artifact caused by the mesh used in the simulation. As such, angle sensor 220 placed at the second position may be robust against a positioning tolerance in the axial direction.

In some implementations, axial robustness of angle sensor 220 may be further increased with additional magnets 210. For example, if angle sensor 220 is placed between two magnets 210 configured to rotate about an axis, then angle error due to axial positioning tolerances may be further reduced or even eliminated (e.g., without software compensation).

As indicated above, FIGS. 5A-5D are provided merely as an example. In other words, all radii, distances, positions, and the like, associated with example implementation 500 are provided merely as examples to facilitate an understanding of how to determine beneficial off-axis positions for angle sensor 220. Other examples are possible and may differ from what was described with regard to FIGS. 5A-5D.

Implementations described herein may relate to placing an angle sensor at a first off-axis position, relative to a magnet, such that an amplitude of a radial component of a rotating magnetic field, produced by the magnet, substantially matches an amplitude of a tangential component of the rotating magnetic field. In some implementations, placing the angle sensor at the first off-axis position may eliminate a need for EOL calibration of the angle sensor.

Implementations described herein may further rotate to placing the angle sensor at a second off-axis position such that a gradient magnitude of the radial component of the rotating magnetic field is substantially the same as a gradient magnitude of the tangential component of the rotating magnetic field. In some implementations, placing the angle sensor at the second off-axis position may increase robustness of the angle sensor against one or more positioning tolerances.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" am intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A magnetic angle sensor, comprising:
   one or more sensor components configured to:
      determine, based on a rotating magnetic field produced by a magnet, a rotation angle of the magnet during a substantially concentric rotation of the magnet connected to a rotatable object,
      the rotatable object being positioned to substantially concentrically rotate about an axis,
      the rotating magnetic field having a radial component and a tangential component, and
      the magnetic angle sensor being positioned at a sensor position having a non-zero radial distance from the axis,
         a gradient magnitude of the radial component being no more than 10% different than a gradient magnitude of the tangential component at the sensor position that is at least half a magnet radius of the magnet from the axis.

2. The magnetic angle sensor of claim 1, where the non-zero radial distance from a center of the magnet is approximately equal to two times the magnet radius,
   the magnet radius being an outer radius when the magnet is a ring magnet, or
   the magnet radius being a disk radius when the magnet is a disk magnet.

3. The magnetic angle sensor of claim 1, where the radial component and the tangential component are provided to determine the rotation angle of the magnet and hence the rotatable object,
   the determined rotation angle of the magnet including an angle error that is approximately less than one degree.

4. The magnetic angle sensor of claim 1, where the magnetic angle sensor is positioned at a non-zero axial distance from a surface of the magnet.

5. The magnetic angle sensor of claim 1, where the one or more sensor components are configured to sense the radial component or the tangential component based on a Hall effect, a tunnel magnetoresistance (TMR) effect, a giant magnetoresistance (GMR) effect, or an anisotropic magnetoresistance (AMR) effect.

6. The magnetic angle sensor of claim 1, where the magnet is a ring magnet or a disk magnet, and the magnetic angle sensor is positioned relative to the ring magnet or disk magnet.

7. The magnetic angle sensor of claim 1, where the magnetic angle sensor is positioned at the sensor position, based on the gradient magnitude of the radial component being no more than 5% different than the gradient magnitude of the tangential component at the sensor position.

8. The magnetic angle sensor of claim 1, where the non-zero radial distance from the axis is approximately 23 mm.

9. The magnetic angle sensor of claim 8, where the magnet is a ring magnet with an inner radius of approximately 7 mm and an outer radius of approximately 12 mm.

10. The magnetic angle sensor of claim 1, where the one or more sensor components, when determining the rotation angle of the magnet, are to:
    determine the rotation angle of the magnet with respect to a reference direction.

11. A method comprising:
    mounting a magnet fixedly to a rotatable object,
       the rotatable object being positioned to concentrically rotate about an axis; and
    positioning a magnetic angle sensor at a sensor position having a non-zero radial distance from the axis,
       the magnetic angle sensor configured to determine a rotation angle of the rotatable object based on a rotating magnetic field produced by the magnet and sensed by the magnetic angle sensor,
       the rotating magnetic field having a radial component and a tangential component,
    the magnetic angle sensor being positioned at the sensor position based on a gradient magnitude of the radial component,
       the gradient magnitude of the radial component being no more than 10% different than a gradient magnitude of the tangential component at the sensor position that is at least half a magnet radius of the magnet from the axis.

12. The method of claim 11, where the non-zero radial distance from a center of the magnet is approximately equal to two times the magnet radius,
    the magnet radius being an outer radius when the magnet is a ring magnet, or
    the magnet radius being a disk radius when the magnet is a disk magnet.

13. The method of claim 11, where the radial component and the tangential component are provided to determine the rotation angle of the magnet and hence the rotatable object,
    the determined rotation angle of the magnet including an angle error that is approximately less than one degree.

14. The method of claim 11, where the magnetic angle sensor is positioned at a non-zero axial distance from a surface of the magnet.

15. The method of claim 11, further comprising:
sensing, by the magnetic angle sensor, the radial component or the tangential component based on a Hall effect, a tunnel magnetoresistance (TMR) effect, a giant magnetoresistance (GMR) effect, or an anisotropic magnetoresistance (AMR) effect.

16. The method of claim 11, where the magnet is a ring magnet or a disk magnet, and the magnetic angle sensor is positioned relative to the ring magnet or disk magnet.

17. The method of claim 11, where the magnetic angle sensor is positioned at the sensor position, based on the gradient magnitude of the radial component being no more than 5% different than the gradient magnitude of the tangential component at the sensor position.

18. The method of claim 11, where the non-zero radial distance from the axis is approximately 23 mm.

19. The method of claim 18, where the magnet is a ring magnet with an inner radius of approximately 7 mm and an outer radius of approximately 12 mm.

20. The method of claim 11, where determining the rotation angle of the magnet comprises:
determining the rotation angle of the magnet with respect to a reference direction.

* * * * *

UNITED STATES PATENT AND TRADEMARK OFFICE
CERTIFICATE OF CORRECTION

PATENT NO. : 10,732,009 B2
APPLICATION NO. : 16/227250
DATED : August 4, 2020
INVENTOR(S) : Llorenc Vallmajo I Ribas Page 1 of 1

It is certified that error appears in the above-identified patent and that said Letters Patent is hereby corrected as shown below:

On the Title Page

In Lines 2-3 of (57) Abstract "The rotatable object may be portioned to concentrically rotate about an axis." should be changed to -- The rotatable object may be positioned to concentrically rotate about an axis. --

Signed and Sealed this
Seventeenth Day of November, 2020

Andrei Iancu
*Director of the United States Patent and Trademark Office*